(12) United States Patent
Ott

(10) Patent No.: US 7,611,125 B2
(45) Date of Patent: Nov. 3, 2009

(54) VALVE AND METHOD FOR PRODUCING A VALVE

(75) Inventor: Hubert Ott, Ravensburg (DE)

(73) Assignee: Aweco Appliance Systems GmbH & Co. KG, Neukirch (DE)

( * ) Notice: Subject to any disclaimer, the term of this patent is extended or adjusted under 35 U.S.C. 154(b) by 240 days.

(21) Appl. No.: 11/790,898

(22) Filed: Apr. 27, 2007

(65) Prior Publication Data

US 2007/0246667 A1 Oct. 25, 2007

Related U.S. Application Data

(63) Continuation-in-part of application No. 11/013,880, filed on Dec. 17, 2004, now Pat. No. 7,210,494.

(30) Foreign Application Priority Data

Dec. 19, 2003 (DE) ................. 103 60 706

(51) Int. Cl.
*F16K 1/42* (2006.01)
(52) U.S. Cl. ................... 251/359; 251/118; 29/890.122
(58) Field of Classification Search ................ 251/118, 251/359; 29/890.122
See application file for complete search history.

(56) References Cited

U.S. PATENT DOCUMENTS

| 3,077,896 | A | | 2/1963 | Weingard |
| 3,180,360 | A | | 4/1965 | Cyrille |
| 3,191,277 | A | | 6/1965 | Glasgow |
| 3,736,640 | A | | 6/1973 | Freiheit |
| 4,901,754 | A | | 2/1990 | Sable et al. |
| 5,002,231 | A | * | 3/1991 | Reiter et al. ............. 239/585.1 |
| 5,107,890 | A | | 4/1992 | Gute et al. |
| 6,035,532 | A | | 3/2000 | Earnhardt |
| 6,039,271 | A | * | 3/2000 | Reiter ...................... 239/585.4 |
| 6,131,826 | A | * | 10/2000 | Teiwes .................. 239/533.11 |
| 6,173,914 | B1 | | 1/2001 | Hopf et al. |
| 6,543,136 | B1 | | 4/2003 | Parish |
| 7,444,991 | B2 | * | 11/2008 | Joseph ....................... 123/467 |

FOREIGN PATENT DOCUMENTS

| DE | 39 39 093 A1 | 5/1991 |
| DE | 196 02 068 C2 | 7/1998 |
| DE | 198 16 289 A1 | 8/1999 |
| DE | 199 14 972 A1 | 3/2000 |
| EP | 1 128 109 A | 8/2001 |
| FR | 2 363 044 A | 3/1978 |
| WO | WO 03/071176 A1 | 8/2003 |

* cited by examiner

*Primary Examiner*—John K Fristoe, Jr.
(74) *Attorney, Agent, or Firm*—Breneman & Georges

(57) ABSTRACT

A valve and a method for producing a valve, in particular for coolant circuits, having a valve seat (2) including a valve seating element (1) for a valve body (3) by stamping the pole shoe to form at least one sealing surface (8) to avoid the disadvantages of the prior art. This is achieved according to the invention by forming at least one sealing surface (8) to form a novel sealing element (1) by utilizing a stamping element to form a stamped surface of the novel valve with a valve seating element.

18 Claims, 4 Drawing Sheets

Figure 1:
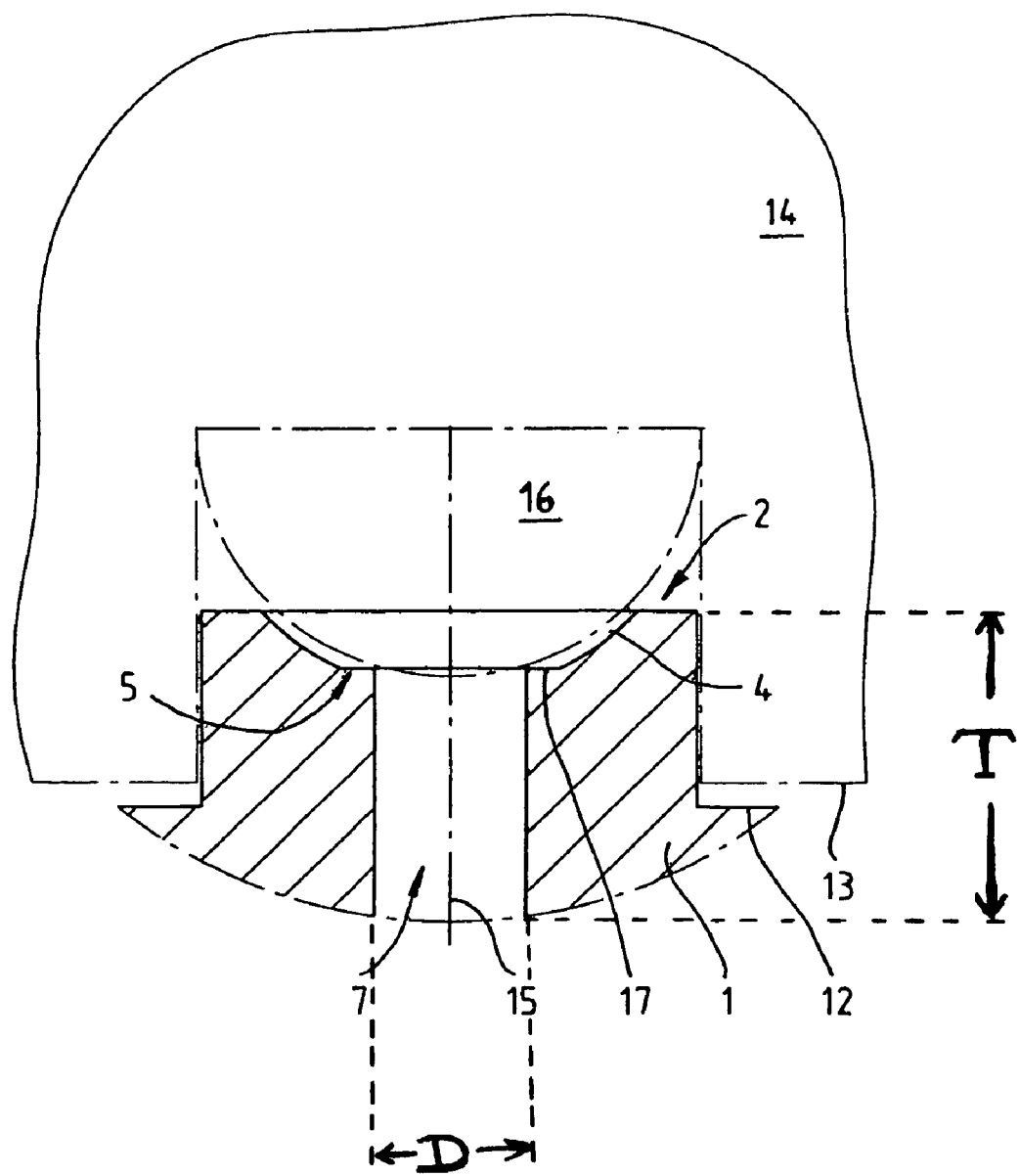

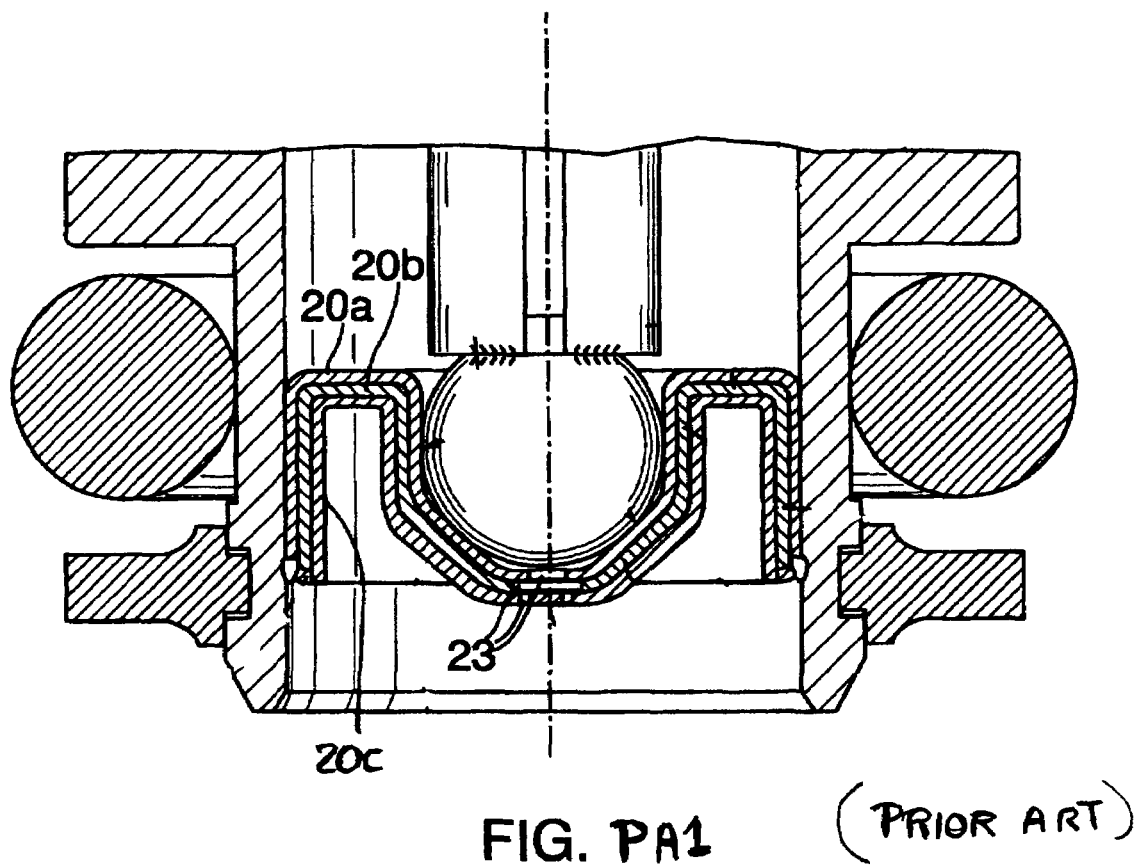
FIG. PA1 (PRIOR ART)

Fig. PA 2 (PRIOR ART)
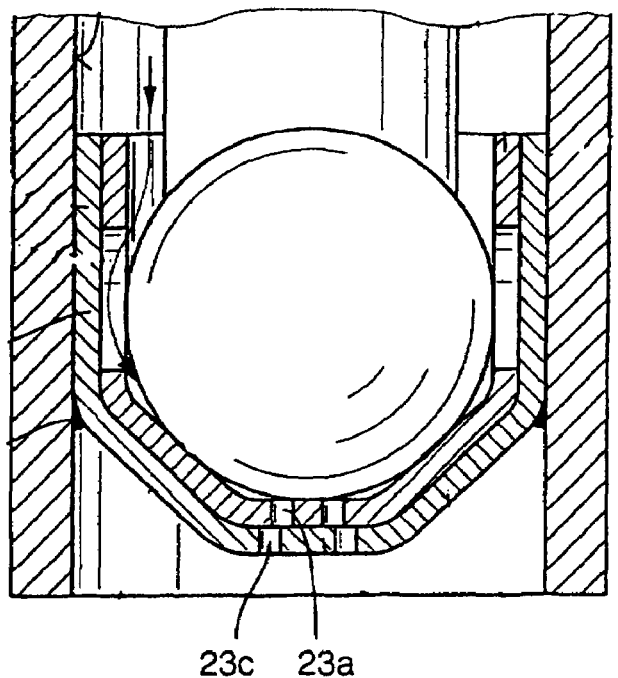
23c  23a
Fig. PA 3 (PRIOR ART)
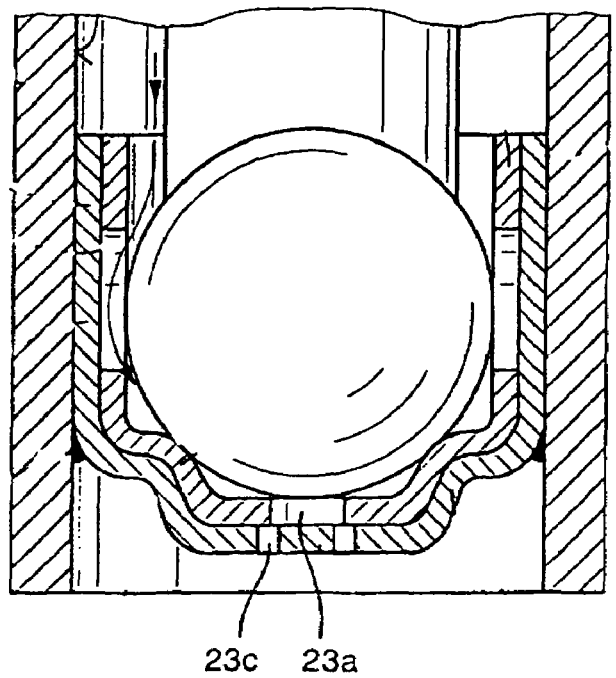
23c  23a

VALVE AND METHOD FOR PRODUCING A VALVE

CROSS REFERENCE TO RELATIONS APPLICATIONS

This application is a continuation-in-part application of U.S. application Ser. No. 11/013,880 filed Dec. 17, 2004 now U.S. Pat. No. 7,210,494.

BACKGROUND OF THE INVENTION (1) Field of the Invention

The invention relates to a valve and a method for producing a valve having a valve seat with a valve seating element. More particularly the novel valve and method for producing the valve includes a stamped out valve seating surface.

(2) Description of Related Art Including Information Disclosed Under 37 C.F.R. 1.97 and 1.98

At present, a wide variety of valves are commercially available. For example, electromagnetic valves, in particular bistable valves, exist and can be used in various applications, for example in fluid circuits of domestic appliances such as refrigerators or for steam expansion for drinks machines, such as coffee machines for example, but also another areas such as in the area of analytics or measuring technology.

In most application areas, such as for instance the application area of domestic appliances, valves which are of a compact design are preferred that can also be produced and fitted with as little effort as possible. To satisfy these requirements, various developments have already become known (cf. DE 199 14 972 A1 or WO 03/071 176 A1).

Known valves have, inter alia, a valve seat, which are sealed by a valve body to ensure the function of the valve. For example in the case of ball valves, a spherical valve seat is accordingly required. For sealing the valve seat, an elastomer seal or the like may be used for example.

In addition, metallic seals may also be used in certain applications. The use of correspondingly metallic, spherical sealing seats requires very precise and uncontaminated production and fitting of the valve. Corresponding valve seats, in particular in the case of valves with armatures, are often hardened after turning on a lathe, producing a certain hardening distortion. In the case of some certain valves, the pole shoe comprising the valve seat may be covered with copper or the like after hardening, so that subsequent soldering of the pole shoe can be advantageously realized. Even with this copper coating, inaccuracies with respect to the form of the valve seat can occur, and may lead to the valve leaking during operation.

In addition, particles of dirt can contaminate the valve seat both during the production of the valve seat and during the fitting of the valve, which in turn can lead to the valve seat leaking during operation.

The known prior art also includes Hopf, et al. U.S. Pat. No. 6,173,914 uncovered by the U.S. Patent Office during the prosecution of parent U.S. application Ser. No. 11/013,880. Hopf, et al. U.S. Pat. No. 6,173,914 pertains to a foil strip layered valve seat having at least two sheet metal layers that are first provided with openings of desired geometries at Station B (FIG. 2 of Hopf, et al. U.S. Pat. No. 6,173,914) which foil strip layers with openings are accurately positioned and pressed together at Station D. The band of foil strip layers is then processed by punching the layered foil strip with either a deep drawing tool or first punched and then cupping after punching with a deep drawing tool.

Hopf, et al. U.S. Pat. No. 6,173,914 relates to a layered valve seat having an opening that is equal to or greater than the thickness of the foil layer. See prior art FIGS. PA1, PA2 and PA3. The ratio of thickness T of the metal sheet to the width of the opening D provides a T/D ratio that is either 1 or a fraction less than 1.

The stamping pressure of the deep drawing tool of Hopf, et al. U.S. Pat. No. 6,173,199 is not specified. The stamping pressure as would be recognized by one skilled in the art would be at a pressure less than a pressure that would deform openings 23 and 23a since such a deformation would impart an undesirable inconsistency in the spray flow characteristics to the spray discharge openings 23(c) FIGS. PA2 and PA3. In addition since foil metal layer strips are used in Hopf, et al. U.S. Pat. No. 6,173,914 all stamping pressures employed will be distributed through the layers and cushioned by the weld, adhesive bonding or other known methods for joining the foil strips together.

The invention in contrast employs a solid unitary metallic body that is not a metal foil but instead a pole shoe made of high grade steel. The unitary metallic body has a thickness T and a valve bore with a diameter D so that the ratio of T/D is never a fraction and always greater than 1 and preferably about 2 which provides an identifiable bulge in the valve bore. The solid unitary metallic body also includes an annular web which is deformed into a stamp deformed sealing surface at the same time the valve bore D is deformed.

The pole shoe also includes an annular stop surface for mating with a corresponding stop surface on the stamping tool which forms a seat for a magnet.

The object of the invention is to provide a valve and a method for producing a valve with which the aforementioned disadvantages of the prior art are reduced or avoided.

BRIEF SUMMARY OF THE INVENTION

The object of the invention is achieved by the method of the invention to produce the novel valve by stamping a stamped surface of at least one sealing surface to provide a valve having at least a part of the sealing surface stamped.

Advantageous embodiments and developments of the invention are possible by utilizing a stamping element that corresponds to the sealing surface of the valve body, utilizing a stamping element to form a partly spherical surface to form the valve seating element, forming at least one recess on the stamping surface of the valve seating element before stamping, forming the recess by turning, forming the recess so that it at least conforms to at least a part of the valve body, providing at least one ridge and more specifically an annular web on the valve seating element by forming or cutting methods, providing a stamping gauge, utilizing a spherical valve body having a stop surface for the stamping gauge and/or permanent magnet and/or spacing element, having the valve seating element form a wall of the valve chamber, forming the valve seating element as a pole shoe, providing an additional seal between the valve body and seating element and providing at least one groove in the valve seating element for the seal.

Accordingly, the production method according to the invention is distinguished by the fact that at least one sealing surface of a sealing element is formed by means of a stamping element by stamping a stamping surface or by the fact that the valve has an at least partly stamped sealing surface for the valve body.

With the aid of a correspondingly advantageous stamping element, a sealing surface of almost any desired form, in particular a three-dimensionally formed sealing surface, can be produced with very high accuracy. A correspondingly high accuracy ensures particularly tight sealing of the valve seat by the valve body, which significantly increases the operational reliability of the valve.

Furthermore, stamping represents a shaping, non-cutting method which significantly reduces the risk of contaminating the valve seat during its production in comparison with the prior art. Moreover, a certain strengthening of the material in the region of the sealing surface can be brought about by the cold forming that accompanies the stamping, which has a positive effect on the service life of the valve. In addition, dimensional inaccuracies of previous production steps, such as for example the turning on a lathe, can be compensated for or eliminated with the aid of the stamping operation.

A stamping element of a form which corresponds at least partly to the form of the valve body is preferably used. This allows finishing operations on the sealing surfaces to become superfluous to the greatest extent. For example, the portion of the stamping element that stamps the valve seat can be formed conically and/or spherically in a way corresponding to the desired form of the valve seat. Specifically valve seats that are correspondingly formed three-dimensionally can be formed particularly cost-effectively in high numbers by the stamping method according to the invention.

In a preferred embodiment and best mode of the invention, a sealing element that is separate from the component having the valve seat, referred to hereafter as the valve seating element, and comprises the stamping surface, i.e. the surface to be stamped or the sealing surface produced by the stamping, is used for sealing the valve seat. If appropriate, this element may be let into the valve seating element as a sleeve or the like with the aid of a corresponding recess.

However, the sealing surface is preferably at least partly formed directly into the valve seating element. This achieves a reduction in the number of components that are used in comparison with the previously mentioned variant, whereby the effort involved in production is reduced.

Advantageously, a projection which comprises the stamping surface is provided before the stamping. In this case, the projection may be both a separate element or a protruding part of the valve seating element. The projection is generally deformed at least partly by the stamping operation in such a way that the amount by which the projection extends is reduced or largely eliminated.

At least one recess comprising the stamping surface is advantageously produced, in particular in the valve seating element, before the stamping operation. In a special development of the invention, the recess is formed as a recess of the valve seating element produced by a turning method. A correspondingly produced recess of the valve seating element can be cost-effectively produced particularly well according to the invention. A comparatively low dimensional accuracy of the recess is made possible here in particular by the fact that the final shaping is subsequently produced by the stamping according to the invention with high dimensional accuracy.

In the case of a spherical valve seat, the recess is advantageously provided at least in certain regions with a somewhat greater radius than the radius of the valve body. With the difference between the radii, it is possible in particular to perform an adaptation of, or make an allowance for, the measuring inaccuracy of the production of the recess.

In an advantageous variant of the invention, the recess is formed at least partly in the form of the valve body. As a result, a comparatively large sealing surface can be produced with a comparatively small stamping volume to be deformed, i.e. the volume of material that is to be deformed by the stamping. A correspondingly large sealing surface leads to particularly good sealing of the valve seat by the valve body, which increases the operational reliability of the valve. Furthermore, according to this variant of the invention, the recess can undertake a certain guiding function for the valve body during the operation of the valve.

At least one projection to be stamped of the valve seating element is advantageously produced during the production of the recess. For example, the formation of the recess has a difference in volume with respect to the form of the valve body, which substantially forms the projection. This difference in volume is eliminated by the stamping operation, to the extent to which it approximately corresponds to the projection, with the sealing surface according to the invention being generated in an advantageous way.

The projection is advantageously formed as an annular web. A corresponding annular web can be produced in a particularly simple manner for example with the aid of cutting methods, for example by turning on a lathe or the like.

As already stated above, the recess and/or the projection is preferably produced at least partly by forming and/or cutting methods. In particular in the case of circular valve seats, the already mentioned turning methods are particularly of advantage.

Preferably, at least one stamping gage with at least one stop for stopping against the sealing element and/or valve seating element is used. The stamping element is advantageously arranged between the stamping gage and the sealing element and/or the valve seating element during stamping. With the aid of a corresponding stamping element, a particularly high dimensional accuracy can be advantageously realized, in particular in mass production. In addition, a particularly high accuracy, including of the length of stroke of the valve body during operation, is achieved by the high accuracy of the position of the sealing surface or of the valve seat, in particular when viewed in the direction of the stroke of the valve body or the direction of the valve axis, that can be achieved by means of the stamping element. A high accuracy of the stroke of the valve body is of particular significance for the operational reliability of the valve.

Furthermore, the position or the distance of a stop for magnets, in particular permanent magnets, with respect to the sealing surface or with respect to the valve seat can be set for example with particularly high accuracy by the stamping element. This dimension is of great relevance in particular for the force of attraction of the valve body at the valve seat.

At least one stop surface for the stopping of a stamping gage, a permanent magnet and/or a spacing element for setting a stroke of the valve body is advantageously provided, it being possible in a particularly advantageous development of this embodiment for only one stop surface to be provided for a number of or all the aforementioned functions. In the case of the last-mentioned multifunctional variant of the stop surface according to the invention, the structural complexity of the valve is reduced, which in turn leads to particularly low-cost production.

In an advantageous embodiment of the invention, the valve seating element comprises a wall of a valve chamber. The valve seating element is preferably formed as a pole shoe. Such measures can lead to a particularly simple or structurally less complex realization of the valve according to the invention, which further reduces the production costs.

A separate seal made of compliant or elastic material, for example a plastic seal, in particular an elastomer seal, Teflon seal or the like, is advantageously arranged between the valve body and the sealing element. For this purpose, the valve seating element may for example be provided with at least one groove for receiving the seal. Such measures allow the tightness of the seal of the valve seat to be additionally increased, which contributes to the improvement in the operational reliability of the valve.

BRIEF VIEW OF THE SEVERAL VIEWS OF THE DRAWING(S

Figure 2:
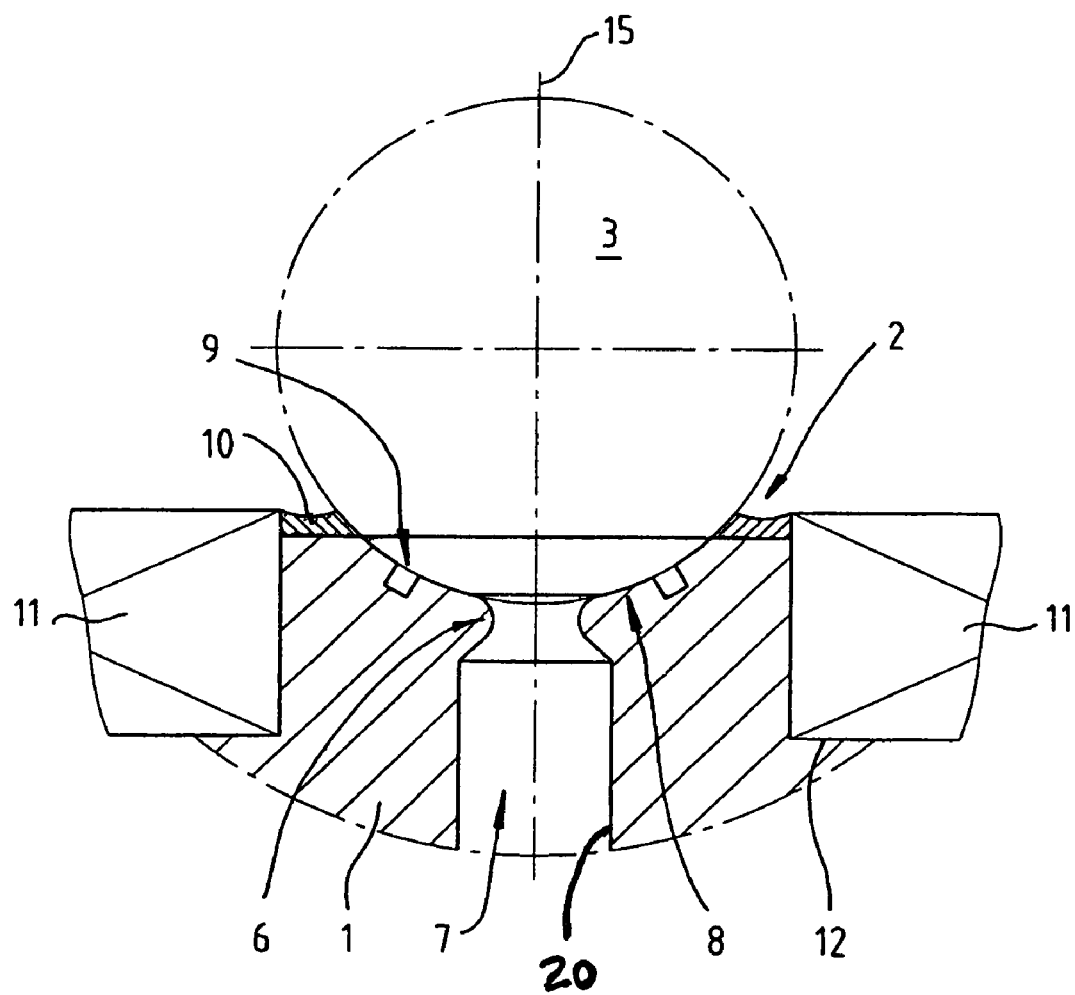

An exemplary embodiment of the invention is represented in the drawing and is explained in more detail below on the basis of the figures, in which specifically:

FIG. PA1 shows a prior art multi layered valve;

FIG. PA2 shows a further prior art exemplary embodiment of a two-layer orifice disk element;

FIG. PA3 shows another prior art exemplary embodiment of a two-layer orifice disk element;

FIG. 1 shows a schematic, sectioned representation of a valve seat to be stamped according to the invention; and FIG. 2 shows a schematic, sectioned representation of a stamped valve seat according to the invention.

DETAILED DESCRIPTION OF THE INVENTION INCLUDING BEST MODE

In FIG. 1, a pole shoe 1 is illustrated with a valve seat 2 and a stamping element 16. Here, the state of the valve seat 2 immediately before or during the stamping operation is shown. Before the stamping, a recess 4 of the pole shoe 1 or valve seating element 1 was produced, preferably by means of a turning method, thereby generating a projection or an annular web 5, which comprises a stamping surface 17.

Referring now to FIG. 1 and FIG. 2 the pole shoe 1 has an overall thickness T with a valve bore diameter D wherein T is always greater than D and the ratio of T to D is greater than 1 and is preferably about 2. The pole shoe 1 is preferably constructed of magnetic materials especially steel, machining steel or high-grade steel and includes an annular web 5 and a stop surface 12 which is also preferably annular. The force of stamping gauge 14 is designed to deform annular web 5 into a stamp deformed sealing surface 8 and partly deform valve bore 7 to provide an observable deformation or bulge 6 which connects the stamp deformed sealing surface to the outlet 20.

The stop surface 12 serves the additional purpose of providing a seat for a magnet 11. Preferably the stop surface is also of an annular configuration for supporting an annular magnet.

In FIG. 2, the valve seat 2 after the stamping operation is schematically represented. The deformation 6 of the pole shoe 1 was produced from the projection or annular web 5 by the stamping. According to this figure, it is clear that the deformation 6 leads to a constriction or bulging of the valve bore 7.

Furthermore, a sealing surface 8 was produced by the stamping of the valve seat 2. The sealing surface 8 forms the contact surface between the valve body 3 and the pole shoe 1. A spherical ring has been produced by the stamping as a sealing surface 8 which has a high accuracy of the spherical form with respect to the spherical form of the valve body 3. As a result, the recess 4 is advantageously adapted to the form of the valve body 3, so that a particularly tight valve seat 2 is produced for the valve body 3.

Also represented in FIG. 2 is a notch 9 in the pole shoe 1, which can optionally be provided and is formed for receiving a seal, for example an elastomer seal, Teflon seal or the like. A Teflon seal or elastomer seal 10, which may likewise be optionally provided, is additionally shown. Both the elastomer seal 10 and the seal which can be placed and/or injection-molded into the notch 9 but is not shown any more specifically may be provided under special conditions for the additional sealing of the valve seat 2.

FIG. 2 also reveals a magnet 11, in particular an annular magnet 11. This magnet 11 is precisely localized at the pole shoe 1 with the aid of a stop 12. The exact fixing of the position of the magnet 11 and of the sealing surface 8 has the effect of fixing the force of attraction produced by this magnet for the valve body 3. This ensures that the valve operates in a reliable way.

Furthermore, it is also clear in FIG. 1 that the stop 12 is additionally formed as a stop 12 for a stamping gage 14 or the stop 13 of the latter. During the stamping operation, highly accurate fixing of the position of the sealing surface 8 in the axial direction 15 of the valve or in the direction of the valve stroke of the valve body 3 is fixed with the aid of the stamping gage 14.

In the case of the production method according to the invention, it is generally of advantage quite particularly that the recess 4 can be produced with comparatively low accuracy, including by turning methods. The inaccuracies of the turning on a lathe that exist in this case, both with regard to the form of the recess and with respect to the outer dimensions of the pole shoe 1 or the stop 12, etc., are reduced or eliminated in an advantageous way during the stamping, in particular on account of the stamping gage 14. The stamping gage 14 and/or the stamping element 16 are, for example, hardened elements, so that, specifically in the mass production of corresponding valve seats 2, a high accuracy of numerous valves according to the invention can be realized with low production costs.

In the case of valves according to the invention, a spacing element according to the applicant's international patent application presented in the prior art is used for example between two pole shoes 1. By means of this spacing element, specifically in combination with the stamped valve seat 2 according to the present invention, a valve which is highly precise, and consequently also provides a tight seal, can be produced in a simple way at low cost, so that it is even possible, depending on the application, to dispense with final testing or measuring of the tolerances of individual production steps and/or of the valve in its finally fitted form. The overall effort involved in the production and fitting of corresponding valves according to the invention is accordingly reduced.

In principle, the stamping gage 14 may be produced with very high accuracy by advantageous working of the stop 13, in particular by grinding, polishing, etc. The same applies correspondingly to an abovementioned spacing element between the pole shoes 1.

LIST OF REFERENCE NUMERALS:

1 pole shoe
2 valve seat
3 valve body
4 recess
5 annular web
6 deformation
7 bore
8 sealing surface
9 notch
10 elastomer
11 magnet
12 stop
13 stop
14 gage
15 axis 16 stamping element
17 stamping surface

What is claimed is:

1. A valve of a unitary or solid metallic construction having at least one valve seat (2) for a valve body (3) and having a valve bore (7) therethrough in axial alignment with said valve seat (2) wherein the improvement comprises a single piece valve housing having a valve seat integral with said single piece valve housing, said valve seat having at least one partly stamp deformed sealing surface (8) disposed on the surface of said valve seat (2) to form said at least one partly stamp deformed sealing surface 8 on said valve seat and a partially stamp compressed valve bore having an observable deformation (6) disposed in said valve bore connecting said valve bore (7) to said at least one partly stamp deformed sealing surface (8).

2. The valve of claim 1 further comprising an annular stop surface.

3. The valve of claim 2 further comprising an annular magnet disposed in said annular stop surface.

4. The valve according to claim 1 wherein the sealing surface (8) is substantially concave.

5. The valve according to claim 4 wherein said sealing surface 8 was formed from a recess (4) in the valve seating element (1).

6. The valve according to claim 1 wherein said valve seating element includes at least one stop surface (12) for stopping a stamping gage (14) or holding a permanent magnet (11) or a spacing element.

7. The valve according to claim 1 wherein the valve seating element (1) forms a wall of a valve chamber.

8. The valve according to claim 1 wherein the valve seating element (1) is formed as a pole shoe (1).

9. The valve according to claim 1 or 6 further comprising an additional seal (10) disposed between the valve body (3) and the sealing element (1).

10. The valve according to claim 1 or 6 further comprising at least one groove (9) for receiving a seal (10) in the valve seating element (1).

11. A precision valve comprising:
   (a) a solid single piece of metal forming a combination valve housing and valve seating surface said valve seating surface having a substantially concave seating surface having a portion of said substantially concave seating surface deformed by stamping;
   (b) a valve bore having a first opening and a second opening, said first opening disposed adjacent to said substantially concave seating surface deformed by stamping;
   (c) a stop surface disposed on the outside of said single piece of metal forming said combination valve housing and valve seating surface;
   (d) a stamp deformed bulge disposed in said valve bore intermediate said substantially concave seating surface deformed by stamping and said stop surface; and
   (e) a seal disposed intermediate the ends of said valve seating surface.

12. The precision valve of claim 11 further comprising an annular stop surface and an annular magnet disposed in said annular stop surface.

13. The precision valve of claim 11 or 12 wherein said solid single piece of metal forming a combination valve housing and valve seating surface is constructed of a magnetic material.

14. The precision valve of claim 12 wherein said solid single piece of metal forming a combination valve housing and valve seating surface is composed of high grade steel.

15. The precision valve of claim 11 wherein said solid single piece of metal forming a combination valve housing and valve seating surface has a thickness T and said valve bore has a diameter D and the ratio of T to D is greater than 1.

16. The precision valve of claim 15 wherein said ratio of T to D is greater than 2.

17. A pole shoe constructed of a single piece of metal forming a valve body and valve seat comprising:
   (a) a single piece of metal forming a valve housing having a thickness T from a top surface to a bottom surface;
   (b) a concave seating surface disposed in said top surface;
   (c) a valve bore having a diameter D and an inlet communicating with said concave seating surface disposed in said top surface and an outlet communicating with said bottom surface;
   (d) a stamp deformed annular web disposed intermediate said concave seating surface and said inlet of said valve to form a valve seat in said single piece of metal;
   (e) an annular stop ridge surrounding the outside circumference of said single piece of metal forming said valve housing;
   (f) a stamp deformed bulge disposed between said stamp deformed annular web and said annular stop ridge, said stamp deformed bulge formed by cooperation between said stamp deformed annular web and said annular stop ridge; and
   (g) an annular magnet disposed around said annular stop ridge.

18. The pole shoe of claim 17 wherein the ratio of the thickness T to the diameter D is greater than 1.

* * * * *